United States Patent
Nagami

(10) Patent No.: US 8,429,796 B2
(45) Date of Patent: Apr. 30, 2013

(54) TILT HINGE

(75) Inventor: Tetsuro Nagami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 123 days.

(21) Appl. No.: 13/060,378

(22) PCT Filed: Sep. 25, 2009

(86) PCT No.: PCT/JP2009/004858
§ 371 (c)(1),
(2), (4) Date: Feb. 23, 2011

(87) PCT Pub. No.: WO2010/073440
PCT Pub. Date: Jul. 1, 2010

(65) Prior Publication Data
US 2011/0154616 A1    Jun. 30, 2011

(30) Foreign Application Priority Data
Dec. 25, 2008    (JP) .................. 2008-330500

(51) Int. Cl.
*E05D 11/10*    (2006.01)
(52) U.S. Cl.
USPC .................... 16/334; 16/337; 16/387
(58) Field of Classification Search .......... 16/334, 16/297, 374, 303, 330, 337, 340, 342, 387, 16/335; 248/919, 922, 923; 361/679.27, 361/679.21, 679.22
See application file for complete search history.

(56) References Cited

U.S. PATENT DOCUMENTS

| | | | |
|---|---|---|---|
| 7,975,350 B2 * | 7/2011 | Nagami ........................ 16/367 |
| 8,177,312 B2 * | 5/2012 | Nagami ........................ 312/246 |
| 2006/0021195 A1 * | 2/2006 | Yamada et al. .................. 16/367 |
| 2006/0168756 A1 | 8/2006 | Sato et al. |
| 2011/0075335 A1 * | 3/2011 | Nagami .................. 361/679.01 |
| 2011/0146029 A1 * | 6/2011 | Nagami et al. .................. 16/366 |
| 2011/0239405 A1 * | 10/2011 | Nagami ........................ 16/277 |
| 2012/0036680 A1 * | 2/2012 | Nagami ........................ 16/297 |

FOREIGN PATENT DOCUMENTS

| | | |
|---|---|---|
| EP | 1600646 B1 | 7/2008 |
| JP | 3-107514 U | 11/1991 |
| JP | 2000-55031 A | 2/2000 |
| JP | 2006-105275 A | 4/2006 |
| JP | 2008-196563 A | 8/2008 |

* cited by examiner

*Primary Examiner* — William L. Miller
(74) *Attorney, Agent, or Firm* — Birch, Stewart, Kolasch & Birch, LLP

(57) ABSTRACT

A plate 5 fastened to a D-cut section 3*c* of a rotation shaft 3 by caulking has an engaging hole 5*b* provided therethrough. Further, a positioning protrusion 4*c* for engaging the engaging hole 5*b* is provided in a leaf spring 4 sandwiched between the rotation shaft 3 and the plate 5. The inclination θ1 of the leaf spring 4 made by the amount of a clearance B between the engaging hole 5*b* and the positioning protrusion 4*c* that are distant from the rotation central axis X is smaller than the inclination θ2 made by the amount of a clearance A between the D-cut section 3*c* and the straight portion 4*d* that are close to the rotation central axis X. Thus, the backlash in the rotation direction of the leaf spring 4 can be reduced by providing the positioning protrusion 4*c* and the engaging hole 5*b*.

2 Claims, 7 Drawing Sheets

(a)

(b)

(a)

$L2 - L1 \fallingdotseq D - L3$
$(A) \fallingdotseq (B)$ (b)

$\theta 1 < \theta 2$ (c)

(a)

(b)

D2<L3<D3

(a)

(b)

TILT HINGE

TECHNICAL FIELD

The present invention relates to a tilt hinge having a click mechanism for openably and closably connecting a monitor to a ceiling of a vehicle and holding the monitor at a plurality of angles.

BACKGROUND ART

A conventional hinge having a click mechanism includes as an example a turning mounting mechanism disclosed in Patent Document 1. In the turning mounting mechanism, a shaft passes through a base, a click spring, and a click plate, and also the shaft has the click plate fixed thereto. The click spring is composed of a leaf spring with resiliency in a direction parallel to the axis of the shaft, and a protrusion for a click function that fits in a recess of the click plate is formed in the position corresponding to a curved top of the leaf spring. Further, bent ends at the upper and lower portions of the click spring are provided, and the ends engage with engaging holes provided through the base, thus fixing the base and the click spring to each other in a relation where the click spring fits in the base with a slight backlash. When the shaft is rotated, the click plate is rotated together with the shaft, to cause the recess of the click plate to engage over the protrusion of the click spring and disengage out of the protrusion thereof, thus producing a click action.

PRIOR ART DOCUMENTS

Patent Documents

Patent Document 1: JP-A-2000-55031

SUMMARY OF THE INVENTION

Since the conventional tilt hinge is arranged as discussed above, when the shaft is rotated, the click spring is dislocated in the rotation direction by an amount equivalent to the backlash, and further the click spring is twisted in the rotation direction by the friction between the spring and the click plate, which causes the ends of the click spring to come loose. Because of this, there is a problem such that at the instant when the protrusion of the click spring fits in the recess of the click plate, the click spring collides against the click plate due to the release of the spring force of the click spring to thus produce extremely large collision noise (click sound).

The present invention has been made to solve the above-mentioned problems, and an object of the present invention is to reduce the backlash in the rotation direction of a leaf spring, and prevent the production of collision noise.

The tilt hinge according to the present invention includes a shaft that is connected with an openable and closable body and serves as a rotation shaft for opening and closing the body; a base that pivotally supports the shaft and also has one of a click protrusion and a click recess on a circumference centered on the rotation shaft; a plate that is attached at an end of the shaft and rotated integrally with the shaft; and a leaf spring located between the base and the plate, and fitted in with the shaft to be rotated, and has the other of the click protrusion and the click recess that fits in the one of the click protrusion and the click recess provided on the base to hold the openable and closable body in a predetermined rotation angle position, wherein the plate has an engaging hole, and the leaf spring has a positioning protrusion for engaging with the engaging hole of the plate and is rotated integrally with the shaft and the plate.

According to the present invention, since the positioning protrusion of the leaf spring is arranged to engage with the engaging hole of the plate to cause the leaf spring to be rotated integrally with the shaft and the plate, it is possible to reduce the backlash in the rotation direction of the leaf spring, and prevent the production of collision noise.

BRIEF DESCRIPTION OF THE DRAWINGS

FIG. 6(a) is a front view thereof; and FIG. 6(b) is a side view thereof.

FIG. 9(a) shows the positional relationship between the rotation shaft, the leaf spring, and the plate; FIG. 9(b) shows the backlash in the rotation direction of the leaf spring; and FIG. 9(c) shows the backlash in the rotation direction of the leaf spring under a condition where neither of a positioning protrusion and an engaging hole is provided.

FIG. 10(a) is a front view thereof; and FIG. 10(b) is a sectional view thereof.

FIG. 11(a) is a sectional view showing a state where the leaf spring is not flexed; and FIG. 11(b) is a sectional view showing a state where the leaf spring is flexed.

BEST MODE FOR CARRYING OUT THE INVENTION

In the following, embodiments of the present invention will now be described with reference to the accompanying drawings in order to explain the present invention in more detail.

First Embodiment

Figure 1:
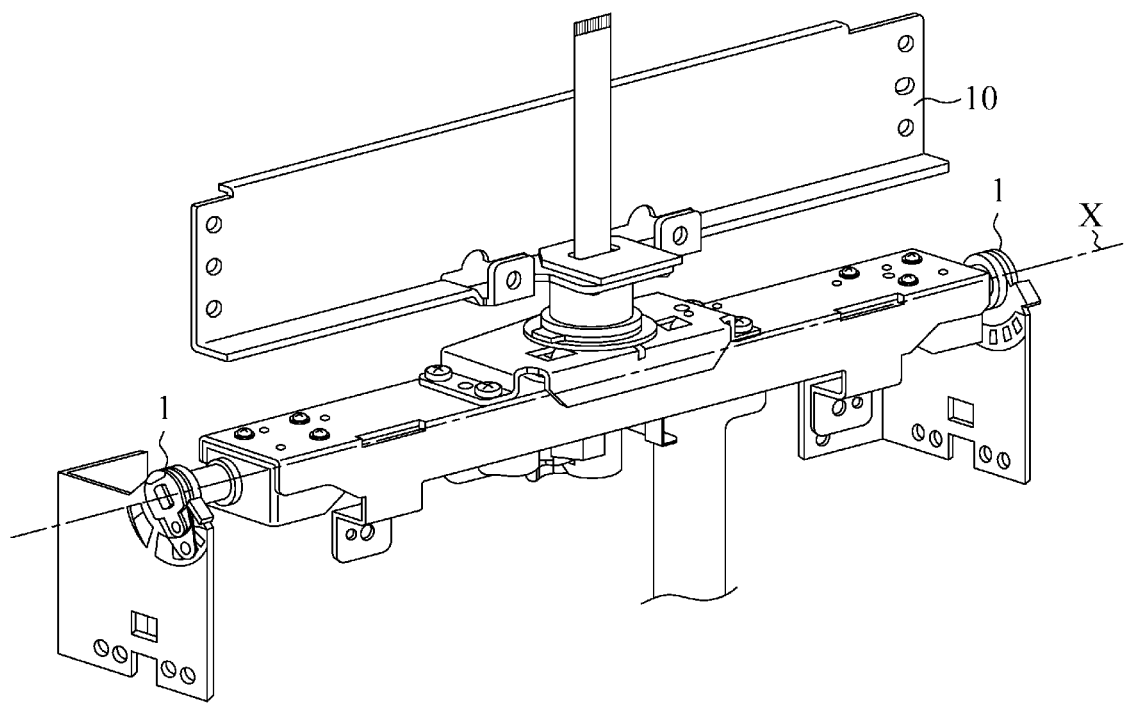
FIG. 1 is a perspective view showing the entire structure of a hinge mechanism in accordance with a first embodiment of the present invention.

In a first embodiment of the present invention, an explanation will be given by taking as an example the case where a hinge mechanism consisting of two tilt hinges is used for raising and laying a monitor disposed on a ceiling of a vehicle from and in a housing case by opening and closing the monitor. FIG. 1 is a perspective view showing a structure of a hinge mechanism in accordance with a first embodiment of the present invention, and FIG. 2 shows an operation of a monitor 11 by using the hinge mechanism, and is a perspective view showing a state where the monitor 11 is opened 120 degrees.

As shown in FIG. 1, tilt hinges 1 rotate a monitor mounting member 10 having the monitor 11 attached thereon with a central axis X of rotation as a central axis.

Figure 2:
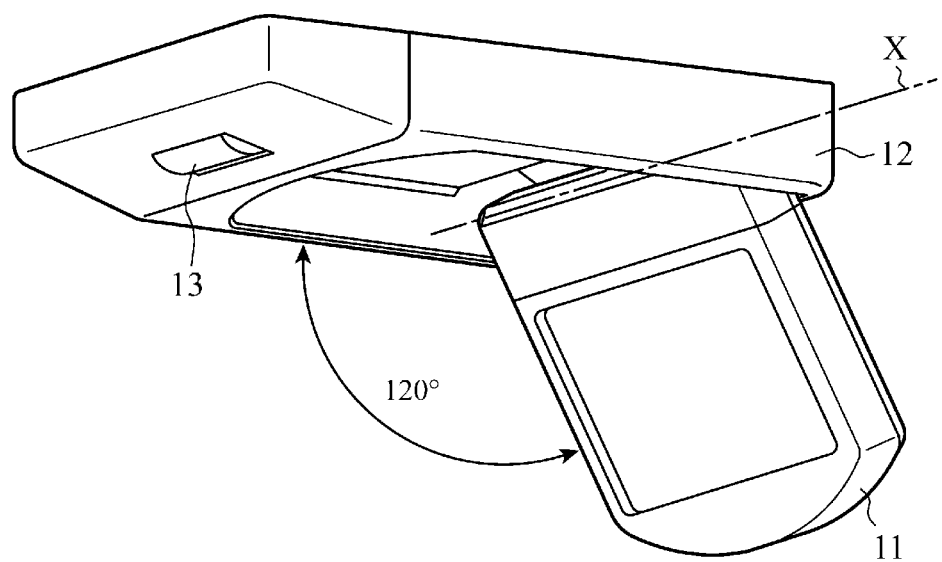
FIG. 2 is a perspective view showing an operation of a monitor by the hinge mechanism in accordance with the first embodiment of the present invention, with the monitor opened 120 degrees.

The central axes X of rotation as shown in FIG. 1 and FIG. 2 are the same axis, and the monitor 11 attached on the monitor mounting member 10 is opened and closed with the two tilt hinges 1. As shown in FIG. 2, the monitor 11 is normally housed within a housing case 12. As a button 13 provided on the housing case 12 is pushed, the monitor 11 is unlocked in synchronization with the button 13 to be turned in the open direction by self-weight. Thereafter, as a user opens and closes the monitor 11 by a manual operation with the central axis X of rotation as a center, the tilt hinges 1 hold the monitor 11 in a predetermined rotation angle position by virtue of a click action.

Figure 3:
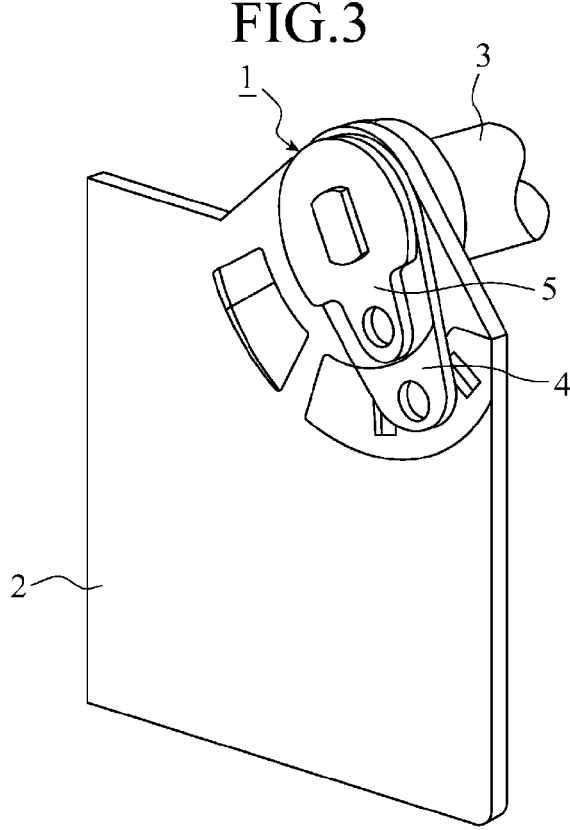
FIG. 3 is a perspective view showing a structure of a tilt hinge in accordance with the first embodiment of the present invention.
Figure 4:
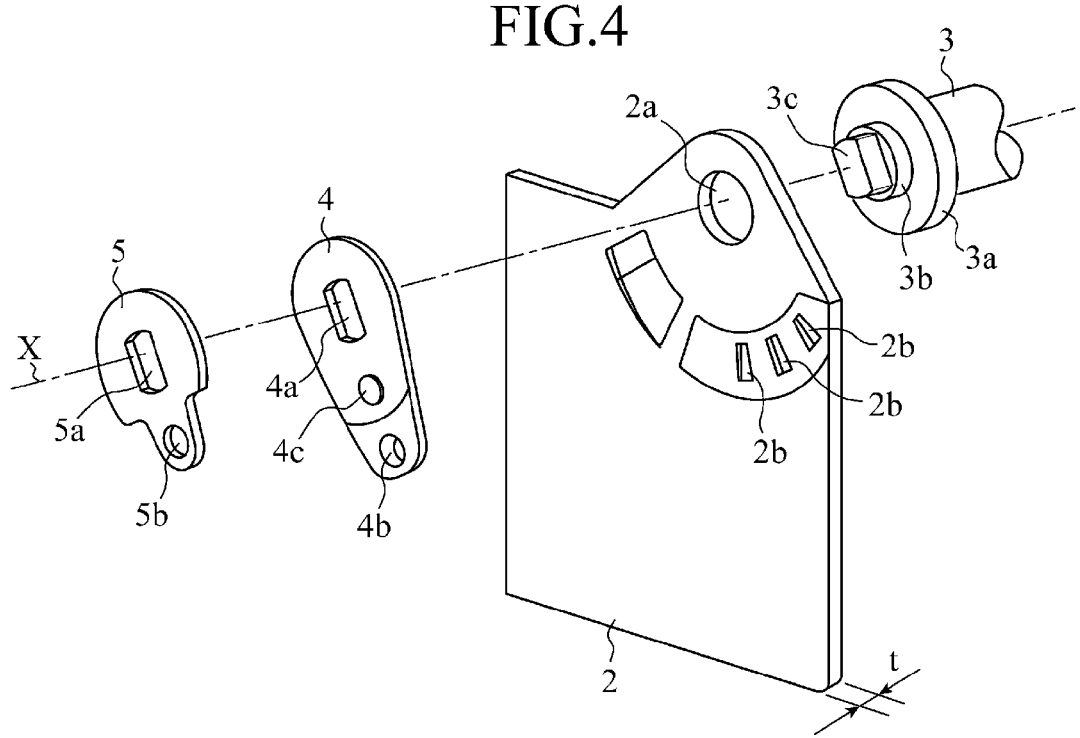
FIG. 4 is an exploded perspective view showing the structure of the tilt hinge in accordance with the first embodiment of the present invention.
Figure 5:
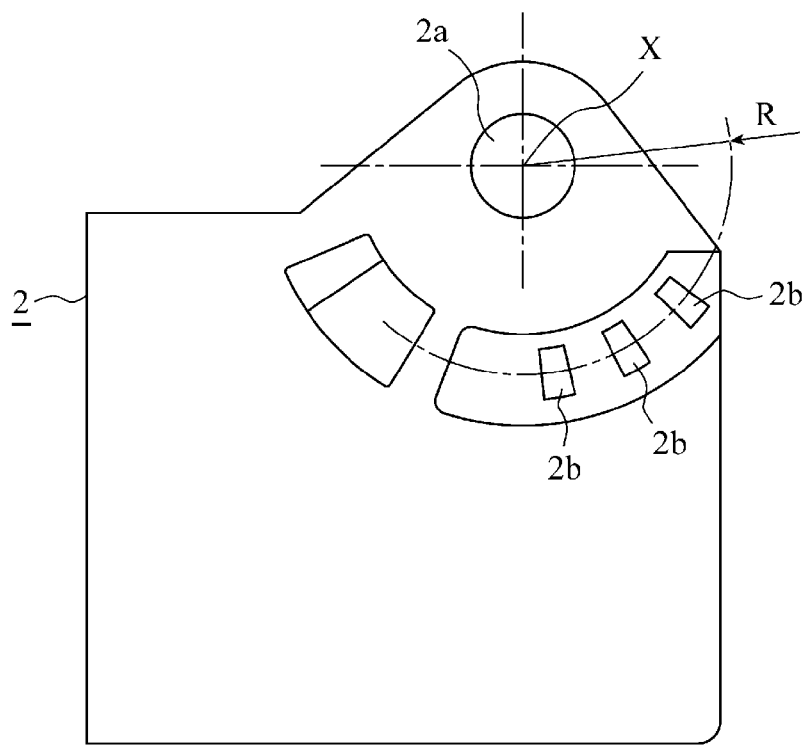
FIG. 5 is a front view showing a structure of a base of the tilt hinge in accordance with the first embodiment of the present invention.
Figure 6:
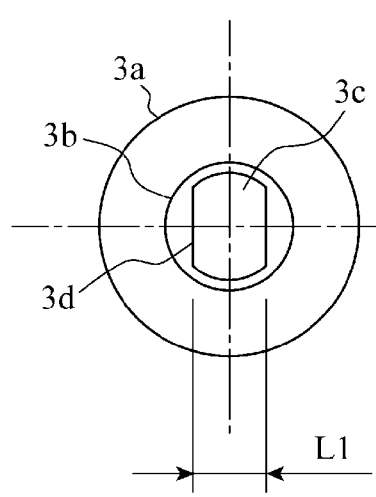
FIG. 6(a) and FIG. 6(b) show a structure of a rotation shaft of the tilt hinge in accordance with the first embodiment of the present invention.
Figure 6:
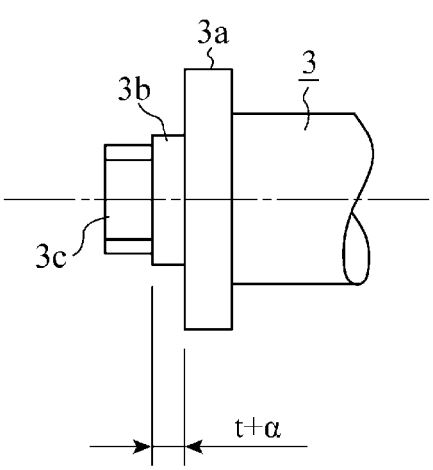
Figure 7:
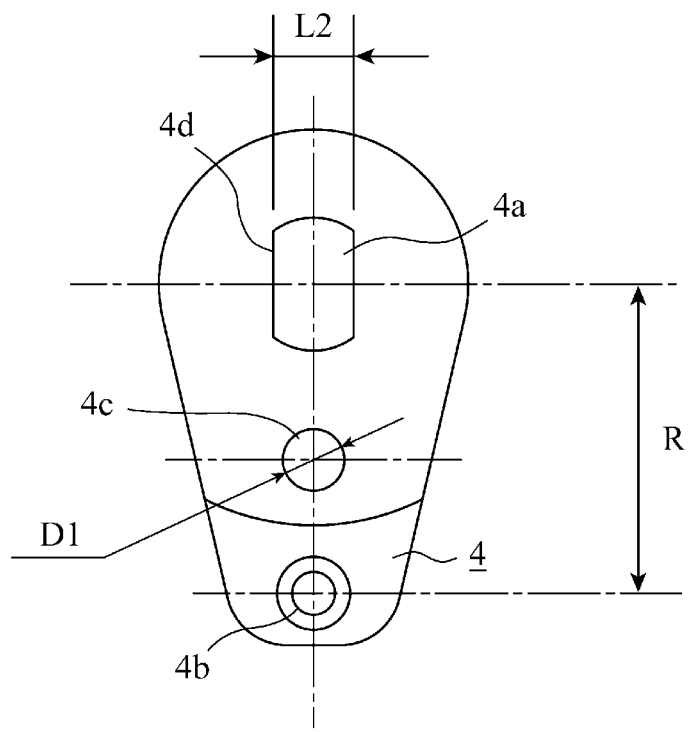
FIG. 7 is a front view showing a structure of a leaf spring of the tilt hinge in accordance with the first embodiment of the present invention.
Figure 8:
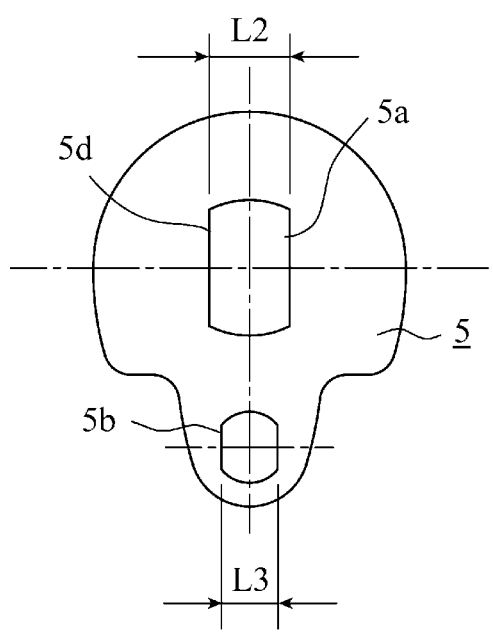
FIG. 8 is a front view showing a structure of a plate of the tilt hinge in accordance with the first embodiment of the present invention.

Next, a description will be given of the tilt hinge 1 in accordance with the first embodiment of the present invention. FIG. 3 is a perspective view showing a structure of the tilt hinge 1, FIG. 4 is an exploded perspective view showing a structure of the tilt hinge 1, and FIG. 5 is a front view showing a structure of a base 2 of the tilt hinge 1. FIG. 6(a) and FIG. 6(b) show a structure of a rotation shaft 3 of the tilt hinge 1: FIG. 6(a) is a front view; and FIG. 6(b) is a side view. FIG. 7 is a front view showing a structure of a leaf spring 4 of the tilt hinge 1, and FIG. 8 is a front view showing a structure of a plate 5 of the tilt hinge 1.

The tilt hinge 1 is composed of: the base 2 fixed in the housing case 12; the rotation shaft 3 rotatable with respect to the base 2 about the central axis X of rotation as a central axis; and the leaf spring 4 and plate 5 that are rotated integrally with the rotation shaft 3.

A rotation shaft hole 2a for inserting the rotation shaft 3 thereinto is provided through the base 2 having a board thickness t. Further, a plurality of click recesses 2b are provided therein at predetermined intervals on a circumference having a radius R and centered on the central axis X of rotation.

The rotation shaft 3 is provided with a flange 3a having a diameter larger than that of the rotation shaft hole 2a of the base 2, a round section 3b having a shaft diameter smaller than the hole diameter of the rotation shaft hole 2a by a fit level and having a length somewhat larger than the board thickness t of the base 2, and a D-cut section 3c formed at the end of the round section 3b, having a shaft diameter smaller than that of the round section 3b and having a pair of flat faces 3d bilaterally symmetrically formed thereon.

An insertion hole 4a and an insertion hole 5a for inserting the D-cut section 3c of the rotation shaft 3 are provided through the leaf spring 4 and the plate 5, respectively. The insertion hole 4a is provided with a pair of straight portions 4d corresponding to the flat faces 3d. The insertion hole 5a is also provided with a pair of straight portions 5d corresponding to the flat faces 3d. The insertion holes 4a, 5a each have a space larger than the sectional area of the D-cut section 3c by a fit level. That is, letting the width between the flat faces of the D-cut section 3c be L1, there is a clearance with a fit level between the width L1 and the width L2 of each of the straight portions 4d, 5d of the insertion holes 4a, 5a.

A click protrusion 4b which fits in each of the click recesses 2b to produce a click action is provided in the position thereof (the position which is distance R away from the center of the insertion hole 4a) corresponding to the position of the click recess 2b of the base 2 in the leaf spring 4. Further, the leaf spring 4 is formed with a positioning protrusion 4c having a diameter D1 such that the protrusion projects toward the plate 5.

An engaging hole 5b having a hole width L3 larger than the diameter D1 of the positioning protrusion 4c of the leaf spring 4 by a fit level is provided through the plate 5. In the assembled state of the tilt hinge 1, the positioning protrusion 4c fits in the engaging hole 5b.

In assembling the tilt hinge 1, the rotation shaft hole 2a of the base 2 is inserted by the round section 3b of the rotation shaft 3, and the insertion hole 4a of the leaf spring 4 and the insertion hole 5a of the plate 5 are inserted by the D-cut section 3c. After that, the rotation shaft 3 and the plate 5 are fastened to each other by caulking. As the rotation shaft 3 is rotated with respect to the base 2, the leaf spring 4 is rotated integrally with the rotation shaft 3 to cause the click protrusion 4b to slide on the base 2. At the moment, the click protrusion 4b engages in and disengages from each of the click recesses 2b to produce click actions. The monitor 11 is held in a predetermined rotation angle position by fitting the click protrusion 4b in one of the click recesses 2b.

As the rotation shaft 3 is rotated with respect to the base 2, the plate 5 caulked and fastened to the rotation shaft 3 is rotated integrally with the shaft. On the other hand, the leaf spring 4 is fitted in with the D-cut section 3c of the rotation shaft 3 to be rotated integrally with the rotation shaft 3; however, since there is a clearance between the width L1 and the hole width L2, a slight backlash is produced. In order to reduce the backlash in the rotation thereof, the positioning protrusion 4c and the engaging hole 5b are provided. In the following, an explanation will be given of the backlash in the rotation of the leaf spring 4. However, the explanation will be provided on the assumption that the center of the rotation is unmoved.

Figure 9:
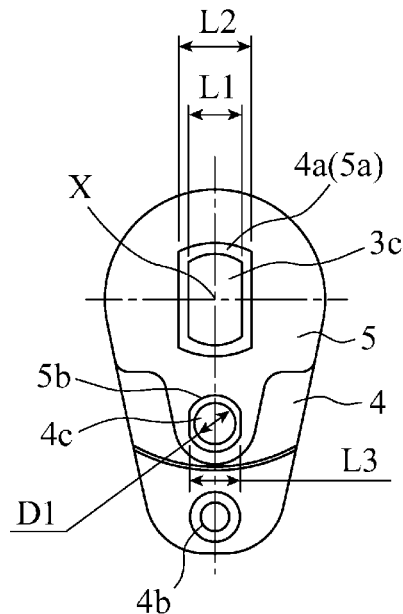
FIG. 9(a) to FIG. 9(c) are front views showing the positions of the leaf spring and the plate with respect to the rotation shaft in the tilt hinge in accordance with the first embodiment of the present invention.
Figure 9:
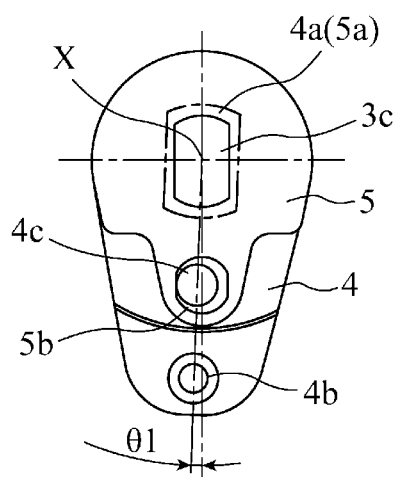
Figure 9:
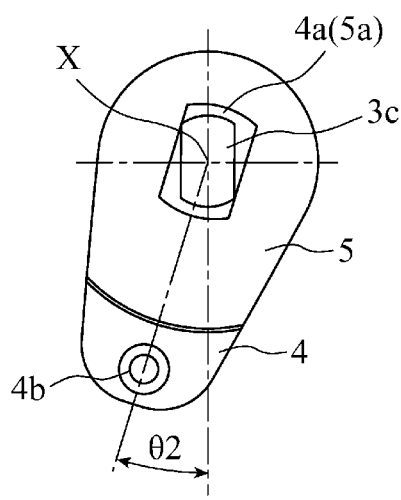

FIG. 9(a) to FIG. 9(c) are front views showing the positions of the leaf spring 4 and the plate 5 with respect to the rotation shaft 3 in the tilt hinge 1 in accordance with the first embodiment of the present invention: FIG. 9(a) shows the positional relationship between the rotation shaft 3, the leaf spring 4, and the plate 5; FIG. 9(b) shows the backlash in the rotation direction of the leaf spring 4; and FIG. 9(c) shows the backlash which is produced in the rotation direction of the leaf spring 4 in the case where neither of the positioning protrusion 4c and the engaging hole 5b is provided.

In FIG. 9(a), the amount of a clearance A (=L2−L1) between the D-cut section 3c of the rotation shaft 3 and the straight portion 4d of the leaf spring 4 (or the D-cut section 3c and the straight portion 5d of the plate 5) shall be equivalent to the amount of a clearance B (=D−L3) between the engaging hole 5b of the plate 5 and the positioning protrusion 4c of the leaf spring 4. At that time, the inclination θ1 of the leaf spring 4 made by the amount of the clearance B between the engaging hole 5b and the positioning protrusion 4c that are distant from the central axis X of rotation is smaller than the inclination θ2 made by the amount of a clearance A between the D-cut section 3c and the straight portion 4d that are close to the central axis X of rotation. Therefore, the backlash in the rotation direction of the leaf spring 4 can be reduced by engaging the positioning protrusion 4c with the engaging hole 5b. As a result, it becomes possible to suppress collision noise of the click protrusion 4b of the leaf spring 4 with the click recess 2b. Moreover, the monitor 11 held by the click recess 2b and the click protrusion 4b which are in engagement with each other is also restrained from being chattered.

As discussed above, in accordance with the first embodiment, the tilt hinge 1 having a click function is constituted of the rotation shaft 3 serving as the axis of rotation for opening and closing the monitor 11; the base 2 for pivotally supporting the rotation shaft 3 to be rotatable; the plate 5 which is fastened to the end of the rotation shaft 3 by caulking to be rotated integrally with the shaft, and also provided with the engaging hole 5b; and the leaf spring 4 which is inserted by the D-cut section 3c of the rotation shaft 3, is sandwiched between the base 2 and the plate 5, and has provided thereon the positioning protrusion 4c that engages with the engaging hole 5b of the plate 5 to cause the leaf spring to be rotated integrally with the rotation shaft 3 and the plate 5. For this reason, although a backlash with a fit level is produced at the fit portion of the rotation shaft 3 and the leaf spring 4, the engaging hole 5b of the plate 5 secured to the rotation shaft 3 by caulking and the positioning protrusion 4c of the leaf spring 4 is engaged with each other to thus reduce the backlash in the rotation direction, which enables to suppress the collision noise of the leaf spring 4.

Second Embodiment

Figure 10:
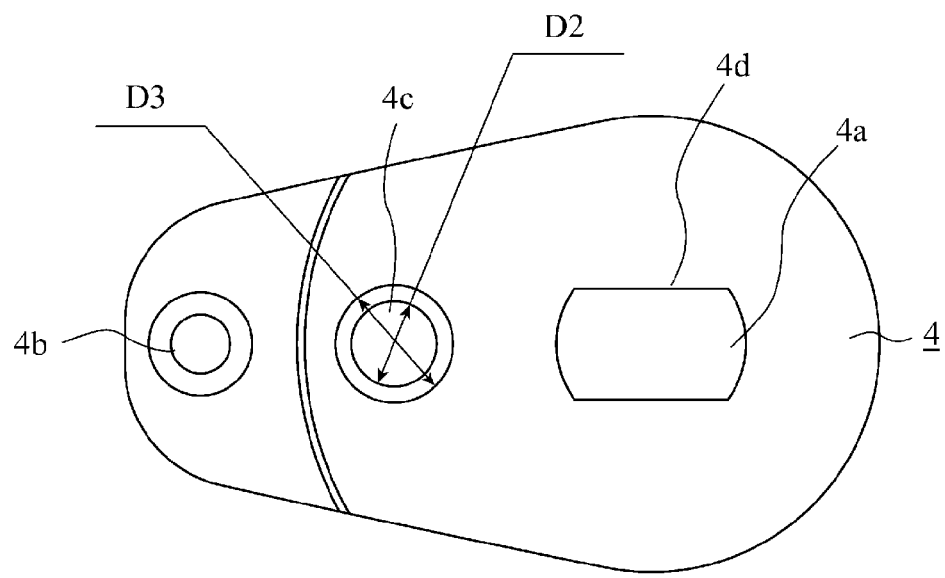
FIG. 10(a) and FIG. 10(b) show a structure of a leaf spring of a tilt hinge in accordance with a second embodiment of the present invention.
Figure 10:
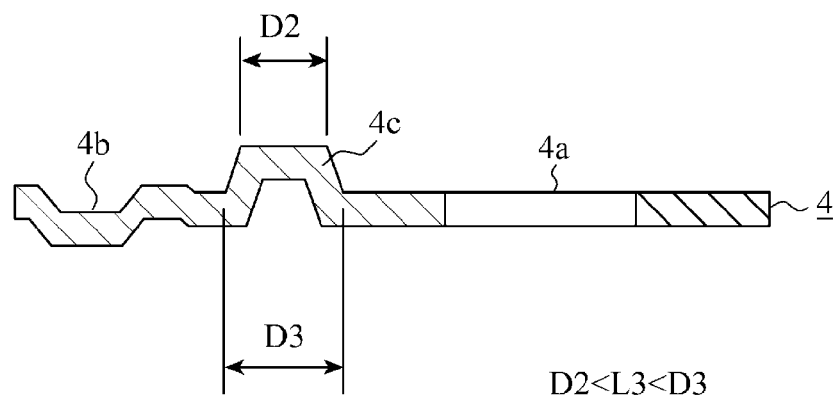

FIG. 10(a) and FIG. 10(b) show a structure of a leaf spring 4 of a tilt hinge 1 in accordance with a second embodiment of the present invention: FIG. 10(a) is a front view thereof; and FIG. 10(b) is a sectional view thereof. As shown in the figures, the positioning protrusion 4c of the leaf spring 4 is formed in a tapered shape such that the tip of the protrusion has a diameter D2 smaller than the diameter D3 of the basal portion of the protrusion. Further, the plate 5 as shown in FIG. 8 is formed so as to have an engaging hole 5b having a hole width L3 while satisfying the relationship of D2<L3<D3. In such a way, the engaging hole 5b of the plate 5 fastened to the rotation shaft 3 by caulking is locked halfway on the tapered face of the positioning protrusion 4c. Therefore, the backlash between the leaf spring 4 and the plate 5 is eliminated, and the collision noise of the leaf spring 4 during click operations is reduced.

As discussed above, in accordance with the second embodiment, the positioning protrusion 4c is arranged to have a tapered outer peripheral face reducing in diameter toward the tip thereof and lock the engaging hole 5b of the plate 5 halfway on the outer peripheral face thereof. Therefore, the backlash between the leaf spring 4 and the plate 5 is eliminated, and it becomes possible to reduce the collision noise produced by the backlash of the leaf spring 4 during click operations.

Third Embodiment

Figure 11:
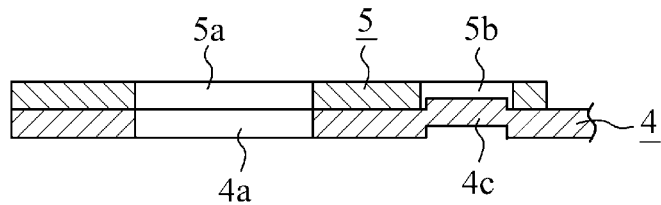
FIG. 11(a) and FIG. 11(b) show a state of a leaf spring and a plate of a tilt hinge in accordance with a third embodiment of the present invention.
Figure 11:
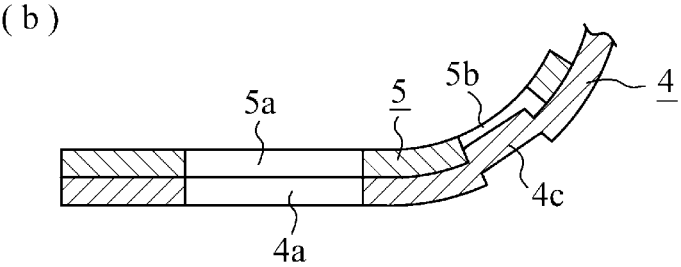

FIG. 11(a) and FIG. 11(b) show a state of a leaf spring 4 and a plate 5 of a tilt hinge 1 in accordance with a third embodiment of the present invention: FIG. 11(a) is a sectional view showing a state where the leaf spring 4 is not flexed; and FIG. 11(b) is a sectional view showing a state where the leaf spring 4 is flexed. FIG. 11(a) and FIG. 11(b) show only the leaf spring 4 and the plate 5 with the depiction of the base 2 and the rotation shaft 3 omitted. Hereupon, the state where the leaf spring 4 is not flexed, as shown in FIG. 11(a), refers to the state where the click protrusion 4b (not shown) fits in the click recess 2b during click operations. The state where the leaf spring 4 is flexed, as shown in FIG. 11(b), refers to the state where the click protrusion 4b (not shown) is sliding on the base 2 after riding on the base.

In the present embodiment, the engaging hole 5b of the plate 5 is arranged to have a generally rhombus hole elongated in a radial direction with the rotation thereof. Thus, during the click operation that the leaf spring 4 is not flexed, as shown in FIG. 11(a), a slight clearance is created in the radial direction with the rotation thereof between the positioning protrusion 4c of the leaf spring 4 and the engaging hole 5b of the plate 5 to prevent the abutment thereof, while during the sliding operation that the leaf spring 4 is flexed, as shown in FIG. 11(b), the outer peripheral face of the positioning protrusion 4c abuts against the inner peripheral face of the engaging hole 5b.

Figure 12:
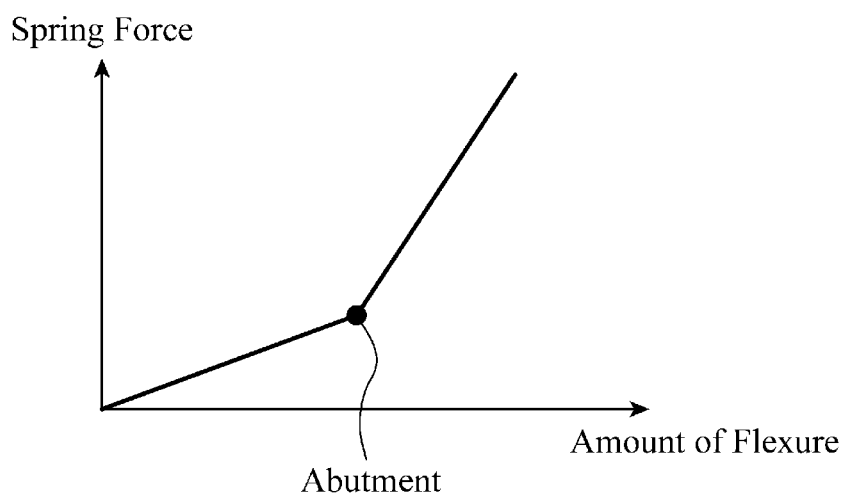
FIG. 12 is a graph showing a relationship between the amount of flexure and the spring force of the leaf spring of the tilt hinge in accordance with the third embodiment of the present invention.

FIG. 12 is a graph showing a relationship between the amount of flexure and the spring force of the leaf spring 4 of the tilt hinge 1 in accordance with the third embodiment of the present invention. In FIG. 12, the abscissa axis shows the amount of flexure of the leaf spring 4 and the ordinate axis shows the spring force of the leaf spring 4. The reaction force (spring constant) by the flexure of the leaf spring 4 changes, with the "abutment" point shown in the graph as a boundary, between until the time when the engaging hole 5b abuts again the positioning protrusion 4c, as shown in FIG. 11(a) and after the time when the engaging hole abutted against the protrusion, as shown in FIG. 11(b). For this reason, when the leaf spring 4 is sliding on the base 2, that is, in the state where the leaf spring 4 is flexed and the positioning protrusion 4c and the engaging hole 5b are in engagement with each other, a high spring pressure can be secured without the need for a large flexure, and it is possible to produce a high friction torque for moving from a click action position to the next click action position. Thus, the operation force of the tilt hinge 1 can be increased.

As discussed above, in accordance with the third embodiment, it is arranged that the positioning protrusion 4c abut against the inner peripheral face of the engaging hole 5b of the plate 5 in the state where the leaf spring 4 is flexed. Because of this, the reaction force (spring constant) by the flexure of the leaf spring 4 can be changed in before and after the abutment thereof, thus enabling the operation force of the tilt hinge 1 to be increased.

In this context, in the example shown in the figures, the tilt hinge is arranged such that the base 2 has the click recesses 2b provided on the circumference centered on the rotation shaft and the leaf spring 4 has provided thereon the click protrusion 4b fitting in the click recess 2b; however, by interchanging the click protrusion and the click recesses in the positions, even when the base 2 has click protrusions provided thereon and the leaf spring 4 has a click recess provided thereon, the same action effect is obtained. Furthermore, though the plate 5 is fastened to the shaft 3 by caulking in the above, the plate may be secured thereto by a screw, bonding, or in any other suitable manner.

INDUSTRIAL APPLICABILITY

The tilt hinge according to the present invention can reduce the backlash in the rotation direction of the leaf spring, and prevent the production of collision noise, and thus the tilt hinge is suitable for use in a tilt hinge or the like having a click mechanism that openably and closably connects a monitor to a ceiling of a vehicle and holds the monitor at a plurality of angles.

The invention claimed is:

1. A tilt hinge including:
    a shaft that is connected with an openable and closable body and serves as a rotation shaft for opening and closing the body;
    a base that pivotally supports the shaft and also has one of a click protrusion and a click recess on a circumference centered on the rotation shaft;
    a plate attached at an end of the shaft such that the plate rotates with the shaft; and
    a leaf spring located between the base and the plate, and fitted to the shaft such that the leaf spring rotates with the shaft, and has the other of the click protrusion and the click recess that fits in the one of the click protrusion and the click recess provided on the base to thus hold the openable and closable body in a predetermined rotation angle position, wherein
    the plate has an engaging hole, and
    the leaf spring has a positioning protrusion for engaging with the engaging hole of the plate and is rotated with the shaft and the plate,
    wherein the positioning protrusion has a tapered outer peripheral face that is reduced in diameter toward a tip thereof such that the positioning protrusion engages with the engaging hole of the plate a distance halfway on the tapered outer peripheral face.

2. The tilt hinge according to claim 1, wherein the positioning protrusion abuts against an inner face of the engaging hole of the plate under a condition where the leaf spring is flexed.

* * * * *